Patented June 10, 1924.

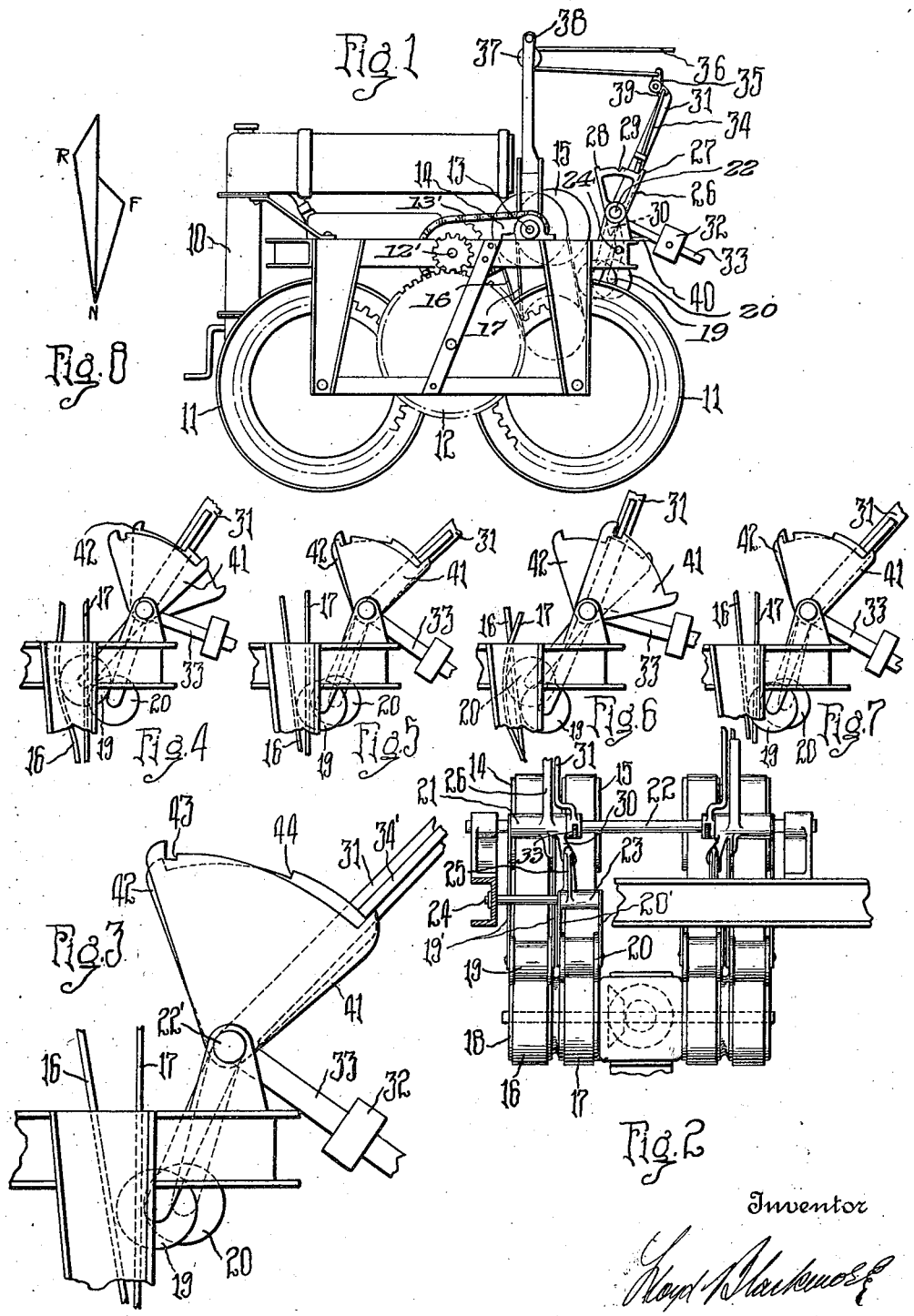
June 10, 1924.  L. BLACKMORE  1,496,974
CONTROL MECHANISM
Filed May 20, 1920

1,496,974

UNITED STATES PATENT OFFICE.

LLOYD BLACKMORE, OF HIGHLAND PARK, MICHIGAN.

CONTROL MECHANISM.

Application filed May 20, 1920. Serial No. 383,008.

*To all whom it may concern:*

Be it known that I, LLOYD BLACKMORE, a subject of the King of Great Britain, and a resident of Highland Park, county of Wayne, and State of Michigan, have invented certain new and useful Improvements in Control Mechanism, of which the following is a full, clear, concise, and exact description, such as will enable others skilled in the art to which the invention relates to make and use the same, reference being made therein to the accompanying drawings, which form a part of this specification.

The invention relates to mechanism whereby an operator may be enabled to control the transmission of power from a distance, and is of special utility in connection with the control of what are known as "rein drive" tractors. In the operation of tractors particularly for agricultural purposes it is of advantage to be able to control the tractor from a distant point, as from a position on a drawn implement or vehicle, and devices have been designed whereby the transmission of power from the engine to the traction elements and the direction of travel may be controlled by the manipulation of lines or "reins." It is common in devices of this kind to provide a control device, such as a lever, with means, such as a spring or weight, whereby the lever may be moved in one direction and to connect thereto a flexible element by which it may be actuated in the opposite direction.

The primary object of my invention is to provide a control device of this character in which the end position, in which the control device would normally stand, shall correspond to the nuetral or non-transmitting position of the power transmitting mechanism, and in which the control device shall be movable by the flexible means selectively into one of a plurality of other positions corresponding to the transmission of power in different directions or at varying rates of speed.

A further object is to provide a control mechanism especially adapted for use in tractors of the type comprising separately and independently actuable traction means on the two sides and by means of which the stopping, starting or reversing of the traction mechanism on the two sides may be controlled by a single pair of flexible elements.

A further object is to simplify the construction and increase the safety of operation of devices of the character mentioned.

With the above and other objects in view as will appear more fully from the following description my invention comprises the features of novelty hereinafter described and set forth in the claims.

In the accompanying drawings illustrating constructions in which my invention may be embodied:—

Fig. 1 is an elevation of a tractor of the type above referred to with one form of the control device of my invention applied thereto.

Fig. 2 is an end elevation showing parts of the control mechanism of the form shown in Fig. 1.

Fig. 3 is a fragmentary view showing in elevation a slightly different form of my invention.

Figs. 4, 5, 6, 7 are views showing the successive positions which may be assumed by the control devices of Fig. 3.

Fig. 8 is a view illustrating diagrammatically the principle of my invention.

In Fig. 1, 10 designates a tractor which might be of any suitable type but is illustrated as comprising a pair of traction wheels 11 arranged to be driven by an intermediate gear 12, which in turn is driven by any suitable gearing through a driving shaft 13. As shown, the shaft 13 is arranged to drive a chain 13' actuating a sprocket wheel on the same shaft with gear 12', which latter engages with the gear 12. It will be understood that in this type of tractor a driving shaft 13 will be provided at each side of the tractor and adapted to drive independently the traction elements or wheels upon the two sides. In this form of tractor each shaft 13 carries pulleys 14 and 15 over which pass belts 16 and 17 driven by a pulley 18 which may be actuated in any desired manner by the engine shaft of the tractor. The belts will be of such length that they will hang loosely upon the pulleys around which they are arranged and must be tightened in order to cause the driving pulleys to transmit motion to the driven pulleys. Suitable reversing mechanism may be arranged between the pulley 15 and the shaft 13. The invention is in no way concerned with the particular type of reversing mechanism employed. The arrangement illustrated, however, is especially adapted to be used in connection with the reversing mechanism for belt driven tractors described in the application of Meyers Serial No. 337,947, filed November 14, 1919. It will be seen that the tightening of the belt 16 will cause the shaft 13 to be driven in one direction which may correspond to the direction of forward travel of the tractor and that tightening of the belt 17 will cause the shaft 13 to be driven in the opposite direction and thereby cause the reversal of the direction of travel of the tractor. In order to provide for the tightening of either of these belts tightening pulleys 19, 20, are mounted adjacent to the belts 16, 17, respectively. The pulley 19 may be supported as shown in arms 19' rigid with the sleeve 21 pivoted upon the rod 22. The pulley 20 may be supported in arms 20' rigid with the sleeve 23 pivoted upon the rod 24, sleeve 23 being also provided with an upwardly extending arm 25. Upon the sleeve 21 is a sector 26 provided, as shown in Fig. 1, with end lugs 27, 28, and with an intermediate notch 29. The downwardly extending arm 30 is also rigidly connected to the sleeve 21 or formed integrally therewith, which arm is arranged in the path of the arm 25 above referred to. It will be seen that the movement of the sleeve 21 in one direction will cause the pulley 19 to swing against the belt 16 thereby tightening the latter while the movement of the sleeve in the opposite direction will cause arm 30 to engage with arm 25 thereby swinging the pulley 20 against the belt 17, thus causing a reversal in the direction of rotation of the shaft 13. In order to actuate the sleeve 21 I have provided a lever 31 which is pivotally supported upon the rod 22. A weight 32 may be arranged upon an arm 33 rigidly connected with the lever 31. A detent 34 is arranged to reciprocate on the lever 31 and is connected at its upper end with one arm of the elbow lever 35, the other arm of which is connected to the flexible element 36 passing over a roller 37 arranged in the standard 38. A spring 39 acts to move the elbow lever 35 in a direction opposite to that in which it is moved by the operation of the line 36. The detent 34 is arranged to travel over the surface of the sector 26 and may contact with either of the lugs 27, 28, or may engage in the notch 29.

The operation of this form of my invention is as follows:—

In the position of parts as shown in Fig. 1, the lever 31 will be at its extreme position to the right or rearwardly with reference to the tractor, being maintained in this position by the weight of the arm 33 which may engage with a suitable stop 40 on the frame of the machine. If now it be desired to cause the traction elements 11 to move in the forward direction the line 36 may be operated thereby moving the lever 31 forwardly until the detent 34 has passed beyond the notch 29. A release of the tension on the line will permit the detent to drop into the notch 29 thereby connecting the lever to the sector 26. The weight of arm 33 will now cause the sector 26 to move rearwardly thereby applying pulley 19 to the belt 16, and bringing the pulleys over which such belt travels into driving relation. At any time when it may be desired to stop the forward motion of the traction elements a slight pull may be given to the line 36, thereby releasing the detent 34 from the notch 29. The pulley 19 will immediately swing to its inoperative position, and the parts will again be in the position shown in Fig. 1. If it be desired to reverse the direction of travel of wheel 11 the line 36 may be operated to cause the lever 31 to swing forwardly until the detent 34 comes into engagement with the lug 28. A further movement of the lever in the same direction will cause the arm 30 to engage arm 25 and thereby swing pulley 20 into tightening relation to the reverse belt 17. By a gradual release of the line 36, the lever may be permitted to return to its normal or neutral position, the detent 34 being prevented from engaging with the notch 29 by maintaining a slight tension on the line.

In the form of my invention illustrated in Figs. 3 to 7 inclusive I have provided a pair of sectors 41, 42, the sector 41 being rigidly connected to the arms carrying the reverse pulley 20 and the sector 42 being similarly connected to the direct pulley 19. Both of these sectors are pivotally mounted as upon the rod 22'. In this case the lever 31 is provided with a reciprocating detent 34' which is arranged to travel over the surface of both the sectors 41 and 42. The sector 41 is provided adjacent to its forward edge with a notch 43, and the sector 42 is provided adjacent to its middle portion with a notch or shoulder 44. The contour of the sectors is so formed that the detent 34' may engage the notch 44 without coming in contact with the sector 41, but if the detent 34' is caused to engage in the notch 43 it will then be in a position to swing about the center of the pivot rod 22' without coming in contact with the sector 42.

The operation of this form of my invention is as follows:—

By moving the lever 31 forwardly until the detent 34' has passed beyond the notch or shoulder 44 and then quickly releasing the tension on the line or rein the detent will engage in the notch and the weighted arm 33 will cause the sector 42 to swing rearwardly thereby tightening the forward driving belt 16 by means of the pulley 19, this position of the parts being shown in Fig. 4. If now it be desired to stop the forward travel of the tractor it is only necessary to give a slight pull on the line thereby releasing the detent whereupon the tightening pulley 19 will swing to its inoperative position and the parts will be as shown in Fig. 5. If on the other hand it is desired to reverse the direction of travel the lever 31 may be moved forwardly until the detent 34' comes into a position where upon the quick release of the line, it will drop into the notch 43. The weighted arm 33 will now cause the sector 41 to swing downwardly thereby applying pulley 20 to the reverse belt 17. This operation takes place without interference from the sector 42 owing to the eccentric form of the sector 41 as explained above. The position of the parts will now be as illustrated in Fig. 6. A slight pull on the line will lift the detent from the notch 43 whereupon the parts will return to the neutral position again, as shown in Fig. 7.

It will be understood that the parts already described will be duplicated upon the other side of the tractor, and that thereby the wheels or traction elements upon the two sides of the tractor may be controlled independently of each other and each with a single line. The traction elements upon one side may therefore be caused to travel in either a forward or backward direction or to remain at rest independently of the traction elements upon the other side. The particular form of power-transmitting mechanism shown, however, is not material to my invention as to its broader aspects, and the control mechanism may be used to actuate clutches or other forms of devices generally employed to effect changes in speed or direction of movement.

It will be seen that, in my invention, the normal position of the control device, as the lever 31, that is, the position to which it is normally impelled when released by the operator, is the neutral position, and that a selective effort must be exerted by the operator in order to position the parts in driving relation for either forward or reverse movement. This is illustrated diagrammatically in Fig. 8 in which the neutral position may be indicated at N, the forward driving position at F and the reverse position at R. In order to reach the forward driving position the controlled elements must be moved positively to a certain point and then released, whereas, in order to reach the reverse position, a positive movement to a greater extent is necessary. It will also be seen that, particularly in the forms illustrated in Figs. 3 to 7, irrespective of whether the parts are in position for forward or reverse movement, a pull upon the line whether intentional or otherwise will immediately permit the return of the parts to the neutral position.

It will be obvious that various changes in the details of construction may be made without departing from the spirit and scope of the invention and therefore I do not desire to be limited to the specific features herein described.

Furthermore, while I have herein described my invention in connection with a tractor it is evident that it may be useful in other relations particularly where it is desired to actuate control mechanism from a distant point by means of a flexible connection.

I claim:

1. The combination of power-transmitting mechanism, control devices for said mechanism, a control element for actuating said devices, means tending to move said element normally to a predetermined end position, and means for connecting said element to said devices when moved from said end position whereby, upon engagement of said element with said devices, it will move the same to position for effecting transmission of power.

2. The combination of power-transmitting mechanism, a plurality of control devices therefor, a control element engageable with either of said devices to effect variable transmission of power, means tending to move said element normally toward a predetermined end position, and means for connecting said element at other predetermined positions to said devices selectively whereby, upon engagement of said element with said devices, it will move the selected device to position for effecting transmission of power.

3. Control mechanism comprising a lever, means for automatically moving said lever in one direction, means for manually moving said lever in the other direction, a pair of pivoted sectors each having a notch therein, a detent on the lever adapted to engage either of said notches to thereby move either sector by the automatic movement of the lever, and power-transmitting connections controllable by the sectors.

4. In control mechanism for vehicles the combination of a control element movable in one plane and having a neutral position at one end of its path of travel and having a plurality of power-transmitting positions, means tending to move said element toward its neutral position, and means selectively engaged at the other positions and moved by said first mentioned means to effect variable transmission of power.

5. In control mechanism for vehicles the combination of a control element movable in one plane and having a neutral position at one extremity of its path of travel and also having forward and reverse positions on the same side of said neutral position and means actuable by said element when moved to such forward and reverse positions to effect forward and reverse movement of said vehicle.

6. In control mechanism of the class described a plurality of control devices adapted to effect variable transmission of power, a plurality of sectors, one adapted to actuate each control device by movement in the same direction, a lever provided with a detent adapted to selectively engage either of said sectors, and means for actuating said lever.

7. In a control mechanism the combination of a lever, constantly acting means tending to move said lever to one end position, a flexible element for moving it in the other direction, a plurality of devices selectively engageable by said lever when moved from its end position, said devices being actuated by return of said lever to its end position to thereby effect variable transmission of power.

8. The combination in a vehicle of power-transmitting means adapted to cause reverse travel thereof, controlling devices for said means, and means including a flexible element adapted to position said controlling devices to effect reverse travel, the parts being constructed and arranged to prevent actuation of said devices to cause reverse travel while a substantial pull is being exerted upon said flexible element.

9. In control mechanism for vehicles the combination of means upon each side of the vehicle independently operable to drive the traction elements in a forward or reverse direction, a control device for the driving means of each side, each control device having a neutral end position and also forward and reverse positions, means for moving said control devices automatically to neutral position and means for selectively locating them in forward or reverse positions.

10. In vehicle driving mechanism the combination of direct and reverse driving belts, belt tightening pulleys for each of said belts, a single lever for moving said pulleys, means for moving said lever to an end position in which said pulleys are released, and a flexible member for moving said lever selectively to positions in which it may actuate either of said pulleys.

11. In line-operated control mechanism the combination of a control element arranged to be moved in one direction by a line, means adapted to be positioned by said element whereby transmission of power may be effected, and means whereby a slight pull upon the line will permit the parts to return to non-transmitting position.

12. In tractor control mechanism or the like, a power transmission control device normally in non-transmitting position, a lever automatically movable in one direction and capable, when engaged with said device, of moving the same automatically to power transmitting position, releasable means for engaging said lever with said device, and means operable from a distance to move said lever in opposition to said automatic means and to operate said releasable means either to engage the lever with said device or to release it therefrom.

13. In tractor control mechanism or the like, a power transmission control device normally in non-transmitting position, a lever automatically movable in one direction and capable, when engaged with said device, of moving the same automatically to power transmitting position, means for engaging said lever with said device, and means operable from a distance to move said lever in opposition to said automatic means and to cause engagement thereof with said device, said engaging means being thereafter releasable by a pull upon said operating means to permit release of said control device.

14. In line-operated control mechanism for tractors or the like, a lever normally stressed in one direction toward an end position, flexible means for moving the lever in the opposite direction, two devices adapted to control power transmission and normally in non-transmitting position, means for engaging said lever selectively with either of said devices, said engaging means controlled by said flexible means, whereby upon movement of said lever to a predetermined extent and release of said flexible means the lever will engage and move the selected device to power transmitting position.

15. A reciprocable power transmission control device normally in non-transmitting position, a lever, means constantly operative to move the lever in one direction, a line operable normally to move the lever in the other direction, and a detent on said lever operable by said line and engageable with said control device upon release of said line, whereby said lever is connected to said control device to move the same to power transmitting position.

In testimony whereof I affix my signature.

LLOYD BLACKMORE.